US008320578B2

(12) United States Patent
Kahn et al.

(10) Patent No.: US 8,320,578 B2
(45) Date of Patent: Nov. 27, 2012

(54) HEADSET

(75) Inventors: Philippe Kahn, Aptos, CA (US);
Arthur Kinsolving, Santa Cruz, CA (US); Michael Cory Fairman, Santa Cruz, CA (US); Mark Andrew Christensen, Santa Cruz, CA (US); Peter William Spaulding, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 575 days.

(21) Appl. No.: 12/113,110

(22) Filed: Apr. 30, 2008

(65) Prior Publication Data

US 2009/0274317 A1    Nov. 5, 2009

(51) Int. Cl.
*H04R 1/10* (2006.01)
*H04R 29/00* (2006.01)
*H04R 5/02* (2006.01)
*H02B 1/00* (2006.01)

(52) U.S. Cl. ............. 381/74; 381/58; 381/309; 381/123

(58) Field of Classification Search .................... 381/74, 381/58, 309, 334, 123, 124; 379/201.06; 235/375
See application file for complete search history.

(56) References Cited

U.S. PATENT DOCUMENTS

| | | | |
|---|---|---|---|
| 4,285,041 A | 8/1981 | Smith | |
| 4,578,769 A | 3/1986 | Frederick | |
| 5,446,725 A | 8/1995 | Ishiwatari | |
| 5,446,775 A | 8/1995 | Wright et al. | |
| 5,583,776 A | 12/1996 | Levi et al. | |
| 5,593,431 A | 1/1997 | Sheldon | |
| 5,737,439 A | 4/1998 | Lapsley et al. | |
| 5,771,001 A | 6/1998 | Cobb | |
| 5,955,667 A | 9/1999 | Fyfe | |
| 5,960,085 A | 9/1999 | de la Huerga | |
| 5,976,083 A | 11/1999 | Richardson et al. | |
| 6,013,007 A * | 1/2000 | Root et al. | 482/8 |
| 6,061,456 A | 5/2000 | Andrea et al. | |
| 6,135,951 A | 10/2000 | Richardson et al. | |
| 6,145,389 A | 11/2000 | Ebeling et al. | |
| 6,246,321 B1 | 6/2001 | Rechsteiner et al. | |
| 6,369,794 B1 | 4/2002 | Sakurai et al. | |

(Continued)

FOREIGN PATENT DOCUMENTS

EP    1 104 143    5/2001

(Continued)

OTHER PUBLICATIONS

Weinberg, Harvey, "Minimizing Power Consumption of iMEMS® Accelerometers," Analog Devices, http://www.analog.com/static/imported-files/application_notes/59351518533628845999AN601.pdf, 2002, 5 pages.

(Continued)

*Primary Examiner* — Vivian Chin
*Assistant Examiner* — Douglas Suthers
(74) *Attorney, Agent, or Firm* — Blakely, Sokoloff, Taylor & Zafman LLP; Judith A. Szepesi

(57) ABSTRACT

A method or apparatus to provide an improved headset. The headset includes at least one sensor. The headset further includes a configuration logic to configure the headset based on the position of the headset on the user's head.

22 Claims, 12 Drawing Sheets

U.S. PATENT DOCUMENTS

| | | |
|---|---|---|
| 6,408,330 B1 | 6/2002 | de la Huerga |
| 6,496,695 B1 | 12/2002 | Kouji et al. |
| 6,513,381 B2 | 2/2003 | Fyfe et al. |
| 6,522,266 B1 | 2/2003 | Soehren et al. |
| 6,529,144 B1 | 3/2003 | Nilsen et al. |
| 6,532,419 B1 | 3/2003 | Begin et al. |
| 6,539,336 B1 | 3/2003 | Vock et al. |
| 6,595,929 B2 | 7/2003 | Stivoric et al. |
| 6,685,480 B2 | 2/2004 | Nishimoto et al. |
| 6,786,877 B2 | 9/2004 | Foxlin |
| 6,788,980 B1 | 9/2004 | Johnson |
| 6,790,178 B1 | 9/2004 | Mault et al. |
| 6,813,582 B2 | 11/2004 | Levi et al. |
| 6,823,036 B1 | 11/2004 | Chen |
| 6,836,744 B1 | 12/2004 | Asphahani et al. |
| 6,881,191 B2 | 4/2005 | Oakley et al. |
| 6,885,971 B2 | 4/2005 | Vock et al. |
| 6,898,550 B1 | 5/2005 | Blackadar et al. |
| 6,941,239 B2 | 9/2005 | Unuma et al. |
| 6,959,259 B2 | 10/2005 | Vock et al. |
| 6,975,959 B2 | 12/2005 | Dietrich et al. |
| 7,010,332 B1* | 3/2006 | Irvin et al. ................. 455/575.2 |
| 7,020,487 B2 | 3/2006 | Kimata |
| 7,072,789 B2 | 7/2006 | Vock et al. |
| 7,092,846 B2 | 8/2006 | Vock et al. |
| 7,096,619 B2 | 8/2006 | Jackson et al. |
| 7,148,797 B2 | 12/2006 | Albert |
| 7,155,507 B2 | 12/2006 | Hirano et al. |
| 7,158,912 B2 | 1/2007 | Vock et al. |
| 7,171,331 B2 | 1/2007 | Vock et al. |
| 7,173,604 B2 | 2/2007 | Marvit et al. |
| 7,176,886 B2 | 2/2007 | Marvit et al. |
| 7,176,887 B2 | 2/2007 | Marvit et al. |
| 7,176,888 B2 | 2/2007 | Marvit et al. |
| 7,180,500 B2 | 2/2007 | Marvit et al. |
| 7,180,501 B2 | 2/2007 | Marvit et al. |
| 7,180,502 B2 | 2/2007 | Marvit et al. |
| 7,200,517 B2 | 4/2007 | Darley et al. |
| 7,212,943 B2 | 5/2007 | Aoshima et |
| 7,220,220 B2 | 5/2007 | Stubbs et al. |
| 7,280,096 B2 | 10/2007 | Marvit et al. |
| 7,301,526 B2 | 11/2007 | Marvit et al. |
| 7,301,527 B2 | 11/2007 | Marvit et al. |
| 7,301,528 B2 | 11/2007 | Marvit et al. |
| 7,301,529 B2 | 11/2007 | Marvit et al. |
| 7,328,611 B2 | 2/2008 | Klees et al. |
| 7,365,736 B2 | 4/2008 | Marvit et al. |
| 7,365,737 B2 | 4/2008 | Marvit et al. |
| 7,379,999 B1 | 5/2008 | Zhou et al. |
| 7,387,611 B2 | 6/2008 | Inoue et al. |
| 7,457,719 B1 | 11/2008 | Kahn et al. |
| 7,457,872 B2 | 11/2008 | Aton et al. |
| 7,608,050 B2 | 10/2009 | Shugg |
| 7,647,196 B2 | 1/2010 | Kahn et al. |
| 7,653,508 B1 | 1/2010 | Kahn et al. |
| 7,664,657 B1 | 2/2010 | Letzt et al. |
| 7,753,861 B1 | 7/2010 | Kahn et al. |
| 7,881,902 B1 | 2/2011 | Kahn et al. |
| 7,987,070 B2 | 7/2011 | Kahn et al. |
| 2002/0109600 A1 | 8/2002 | Mault et al. |
| 2002/0138017 A1 | 9/2002 | Bui et al. |
| 2002/0151810 A1 | 10/2002 | Wong et al. |
| 2003/0101260 A1 | 5/2003 | Dacier et al. |
| 2003/0139908 A1 | 7/2003 | Wegerich et al. |
| 2003/0149526 A1 | 8/2003 | Zhou et al. |
| 2003/0208113 A1 | 11/2003 | Mault et al. |
| 2003/0227487 A1 | 12/2003 | Hugh |
| 2003/0236625 A1 | 12/2003 | Brown et al. |
| 2004/0017300 A1 | 1/2004 | Kotzin et al. |
| 2004/0024846 A1 | 2/2004 | Randall et al. |
| 2004/0043760 A1 | 3/2004 | Rosenfeld et al. |
| 2004/0044493 A1 | 3/2004 | Coulthard |
| 2004/0078219 A1 | 4/2004 | Kaylor et al. |
| 2004/0078220 A1 | 4/2004 | Jackson |
| 2004/0122294 A1 | 6/2004 | Hatlestad et al. |
| 2004/0122295 A1 | 6/2004 | Hatlestad et al. |
| 2004/0122296 A1 | 6/2004 | Hatlestad et al. |
| 2004/0122297 A1 | 6/2004 | Stahmann et al. |
| 2004/0122333 A1 | 6/2004 | Nissila |
| 2004/0122484 A1 | 6/2004 | Hatlestad et al. |
| 2004/0122485 A1 | 6/2004 | Stahmann et al. |
| 2004/0122486 A1 | 6/2004 | Stahmann et al. |
| 2004/0122487 A1 | 6/2004 | Hatlestad et al. |
| 2004/0125073 A1 | 7/2004 | Potter et al. |
| 2004/0146048 A1 | 7/2004 | Cotte |
| 2004/0148340 A1 | 7/2004 | Cotte |
| 2004/0148341 A1 | 7/2004 | Cotte |
| 2004/0148342 A1 | 7/2004 | Cotte |
| 2004/0148351 A1 | 7/2004 | Cotte |
| 2004/0225467 A1 | 11/2004 | Vock et al. |
| 2004/0259494 A1 | 12/2004 | Mazar |
| 2005/0027567 A1 | 2/2005 | Taha |
| 2005/0033200 A1 | 2/2005 | Soehren et al. |
| 2005/0038691 A1 | 2/2005 | Babu |
| 2005/0048955 A1 | 3/2005 | Ring |
| 2005/0079873 A1 | 4/2005 | Caspi et al. |
| 2005/0101841 A9 | 5/2005 | Kaylor et al. |
| 2005/0102167 A1 | 5/2005 | Kapoor |
| 2005/0107944 A1 | 5/2005 | Hovestadt et al. |
| 2005/0113650 A1 | 5/2005 | Pacione et al. |
| 2005/0131736 A1 | 6/2005 | Nelson et al. |
| 2005/0146431 A1 | 7/2005 | Hastings et al. |
| 2005/0182824 A1 | 8/2005 | Cotte |
| 2005/0210300 A1 | 9/2005 | Song et al. |
| 2005/0212751 A1 | 9/2005 | Marvit et al. |
| 2005/0212752 A1 | 9/2005 | Marvit et al. |
| 2005/0212753 A1 | 9/2005 | Marvit et al. |
| 2005/0212760 A1 | 9/2005 | Marvit et al. |
| 2005/0222801 A1 | 10/2005 | Wulff et al. |
| 2005/0232404 A1* | 10/2005 | Gaskill .................... 379/201.06 |
| 2005/0235058 A1 | 10/2005 | Rackus et al. |
| 2005/0240375 A1 | 10/2005 | Sugai |
| 2005/0248718 A1 | 11/2005 | Howell et al. |
| 2005/0256414 A1 | 11/2005 | Kettunen et al. |
| 2005/0258938 A1 | 11/2005 | Moulson |
| 2005/0262237 A1 | 11/2005 | Fulton et al. |
| 2006/0017692 A1 | 1/2006 | Wehrenberg et al. |
| 2006/0090088 A1 | 4/2006 | Choi et al. |
| 2006/0109113 A1 | 5/2006 | Reyes et al. |
| 2006/0136173 A1 | 6/2006 | Case, Jr. et al. |
| 2006/0154642 A1 | 7/2006 | Scannell, Jr. |
| 2006/0161459 A9 | 7/2006 | Rosenfeld et al. |
| 2006/0167387 A1 | 7/2006 | Buchholz et al. |
| 2006/0172706 A1 | 8/2006 | Griffin et al. |
| 2006/0223547 A1 | 10/2006 | Chin et al. |
| 2006/0249683 A1 | 11/2006 | Goldberg et al. |
| 2006/0284979 A1 | 12/2006 | Clarkson |
| 2007/0004451 A1 | 1/2007 | Anderson |
| 2007/0017136 A1 | 1/2007 | Mosher et al. |
| 2007/0024441 A1 | 2/2007 | Kahn et al. |
| 2007/0037605 A1 | 2/2007 | Logan et al. |
| 2007/0050157 A1 | 3/2007 | Kahn et al. |
| 2007/0063850 A1 | 3/2007 | Devaul et al. |
| 2007/0075127 A1 | 4/2007 | Rosenberg |
| 2007/0075965 A1 | 4/2007 | Huppi et al. |
| 2007/0125852 A1* | 6/2007 | Rosenberg .................... 235/435 |
| 2007/0142715 A1 | 6/2007 | Banet et al. |
| 2007/0192483 A1 | 8/2007 | Rezvani et al. |
| 2007/0239399 A1 | 10/2007 | Sheynblat et al. |
| 2008/0113689 A1 | 5/2008 | Bailey |
| 2008/0140338 A1 | 6/2008 | No et al. |
| 2008/0165022 A1 | 7/2008 | Herz et al. |
| 2008/0232604 A1 | 9/2008 | Dufresne et al. |
| 2009/0043531 A1 | 2/2009 | Kahn et al. |
| 2009/0082994 A1 | 3/2009 | Schuler et al. |
| 2009/0099668 A1 | 4/2009 | Lehman et al. |
| 2009/0174782 A1 | 7/2009 | Kahn et al. |
| 2009/0234614 A1 | 9/2009 | Kahn et al. |
| 2009/0274317 A1 | 11/2009 | Kahn et al. |
| 2009/0296951 A1 | 12/2009 | De Haan |
| 2009/0319221 A1 | 12/2009 | Kahn et al. |
| 2010/0056872 A1 | 3/2010 | Kahn et al. |

FOREIGN PATENT DOCUMENTS

| | | |
|---|---|---|
| EP | 0 833 537 | 7/2002 |
| WO | WO 02/088926 A1 | 11/2002 |

OTHER PUBLICATIONS

PCT/US2009/042183, International Search Report and Written Opinion, mailed Jun. 24, 2009, 8 pages.

Dao, Ricardo, "Inclination Sensing with Thermal Accelerometers", MEMSIC, May 2002, 3 pages.

Lee, Seon-Woo, et al., "Recognition of Walking Behaviors for Pedestrian Navigation," ATR Media Integration & Communications Research Laboratories, Kyoto, Japan, 4 pages.

Margaria, Rodolfo, "Biomechanics and Energetics of Muscular Exercise", Chapter 3, pp. 105-125, Oxford: Clarendon Press 1976.

Mizell, David, "Using Gravity to Estimate Accelerometer Orientation", Seventh IEEE International Symposium on Wearable Computers, 2003, 2 pages.

Ormoneit, D., et al (2000). Learning and tracking of cyclic human motion. Proceedings of NIPS 2000 (Neural Information Processing Systems), Denver, CO, 894-900.

PCT/US2006/29570, International Search Report and the Written Opinion, mailing date Jul. 17, 2007, 7 pages.

PCT/US2008/072537, International Search Report and Written Opinion, mailing date Oct. 22, 2008, 10 pages.

PCT/US2009/48523, International Search Report and Written Opinion, mailing date Aug. 27, 2009, 8 pages.

PCT/US2006/29570, Notification Preliminary Report on Patentability, mailing date Feb. 7, 2008, 6 pages.

PCT/US2009/042183, International Preliminary Report on Patentability, mailed Jan. 27, 2011, 10 pages.

Zypad WL 1100 Wearable Computer, http://www.eurotech.fi/products/manuals/Zypad%20WL%20201100_sf.pdf, Jan. 16, 2008, 2 pgs.

Bliley, Kara E, et al, "A Miniaturized Low Power Personal Motion Analysis Logger Utilizing MEMS Accelerometers and Low Power Microcontroller," IEEE EMBS Special Topic Conference on Microtechnologies in Medicine and Biology, May 12-15, 2005, pp. 92-93.

Park, Chulsung, et al, "Eco: An Ultra-Compact Low-Power Wireless Sensor Node for Real-Time Motion Monitoring," IEEE Int. Symp. on Information Processing in Sensor Networks, 2005, pp. 398-403.

Wang, Shu, et al, "Location Based Services for Mobiles: Technologies and Standards, LG Electronics MobileComm," IEEE ICC 2008, Beijing, pp. 1-66 (part 1 of 3).

Wang, Shu, et al, "Location Based Services for Mobiles: Technologies and Standards, LG Electronics MobileComm," IEEE ICC 2008, Beijing, pp. 67-92 (part 2 of 3).

Wang, Shu, et al, "Location Based Services for Mobiles: Technologies and Standards, LG Electronics MobileComm," IEEE ICC 2008, Beijing, pp. 93-123 (part 3 of 3).

Weinberg, Harvey, "MEMS Motion Sensors Boost Handset Reliability" Jun. 2006, <http://www.mwrf.com/Articles/Print.cfm?ArticleID=12740>, Feb. 21, 2007, 4 pages.

* cited by examiner

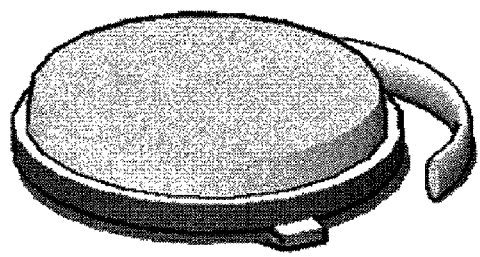
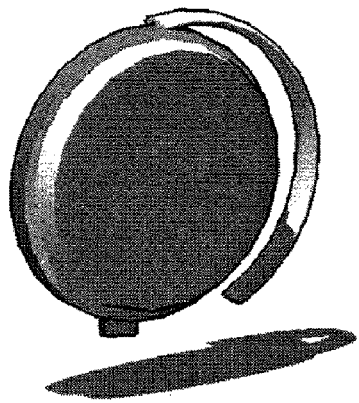
Fig. 1A -1
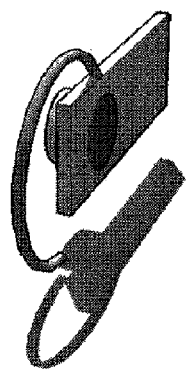
Fig. 1A -2

| Current State | Command | Basic | Exemplary Communication |
|---|---|---|---|
| Off | Long Push | Turns on | Ascending Arpeggio. "Welcome to Motion-Sports. Your Step Counter is now on. To hear your step-count, press once at any time. To start a workout, press twice. To get a summary of your last 5 workouts, press three times. |
| Off | Inactivity | Reduce sensor test | Reduce sensor test frequency, until minimum is reached |
| On | Long Push | Turns off | Descending Arpeggio. "Headset turning off" |
| On | Inactivity | Turns off | Descending Arpeggio. "Headset turning off" |
| No workout in progress | One push | Summary report | "In 27 minutes, you have walked 3,400 steps and covered 1.3 miles." |
| No workout in progress | Two pushes | Initiate workout | Ascending Arpeggio. "Workout is about to start. Once the workout starts, for a progress update press once or to pause the workout press twice at any time. 5-4-3-2-1-GO!" |
| No workout in progress | Three pushes | Overall summary | In your last 5 workouts, you have covered 8.9 miles in 1 hour and 32 minutes at an average pace of 6 minutes and 45 seconds per mile. For best accuracy you can calibrate this instrument in 3 minutes, press twice to start the calibration process, press once to return to the main menu. |
| Workout in progress | One push | Summary report | "Total workout time is 4 minutes and 23 seconds. You have covered 0.75 miles at an average pace of 6 minutes and 45 seconds per mile" |
| Workout in progress | Two pushes | Pause workout | Descending Arpeggio. "Workout Paused. Total workout time is 4 minutes and 23 seconds. You have covered 0.75 miles at an average pace of 6 minutes and 45 seconds per mile. Press once to resume workout, twice to end workout." |
| Workout paused | One push | Restart workout | Ascending Arpeggio. "Workout Resuming. "5-4-3-2-1-GO!" |
| Workout paused | Two pushes | End workout | Descending Arpeggio. "Congratulations, Workout Completed. "Total workout time was 4 minutes and 23 seconds. You covered 0.75 miles at an average pace of 6 minutes and 45 seconds per mile." |

Fig. 7

HEADSET

FIELD OF THE INVENTION

The present invention relates to headsets, and more particularly to using one or more sensors within the headset for improved operation.

BACKGROUND

As portable devices are becoming more common, headsets are proliferating. Headsets include the Bluetooth headsets or plug-in headsets often used with mobile phones, headphones used with music players or other listening devices. Headsets may also be used with stationary devices such as landline telephones, computers, stereos, etc.

While many older headsets are unpowered devices, simply using wires to lead the sound to the user's ears, newer headsets are powered, and often include some processing power. In particular, headsets that have wireless connectivity are battery powered. Some wired headsets also are powered to provide noise cancellation or other features.

SUMMARY

A headset including at least one sensor is described. The sensor is used in the headset to improve function.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A-D are exemplary forms of headsets.

FIG. 7 is a table of one example of using a sports/lifestyle application with a single button user interface.

DETAILED DESCRIPTION

The method and apparatus described is a headset including at least one sensor. The headset, in one embodiment, includes a motion sensor to detect the motion and orientation of the headset. If the headset is in the orientation indicating that it is being worn by a user and exhibiting a motion signature indicative that it is being worn by a user, then certain configurations may be enabled, and the headset may be utilized in certain ways. In one embodiment, an accelerometer may be used to detect position. In one embodiment, an accelerometer may be used to detect minor motions characteristic of being positioned on a user's ear or head, indicating that the headset is being worn. In one embodiment, a temperature, heart rate, or other sensor may be integrated into the headset.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1B:
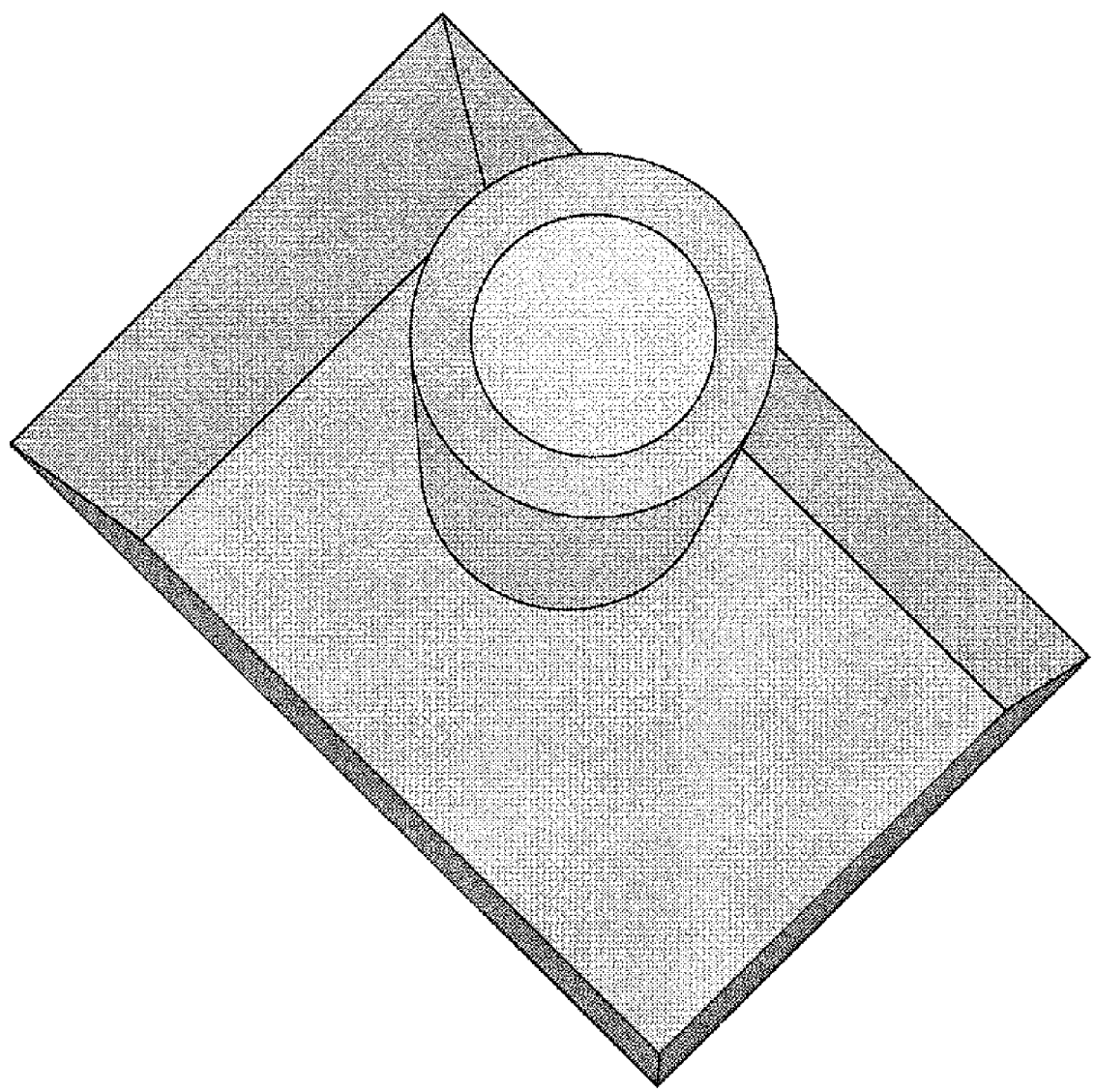
Figure 1C:
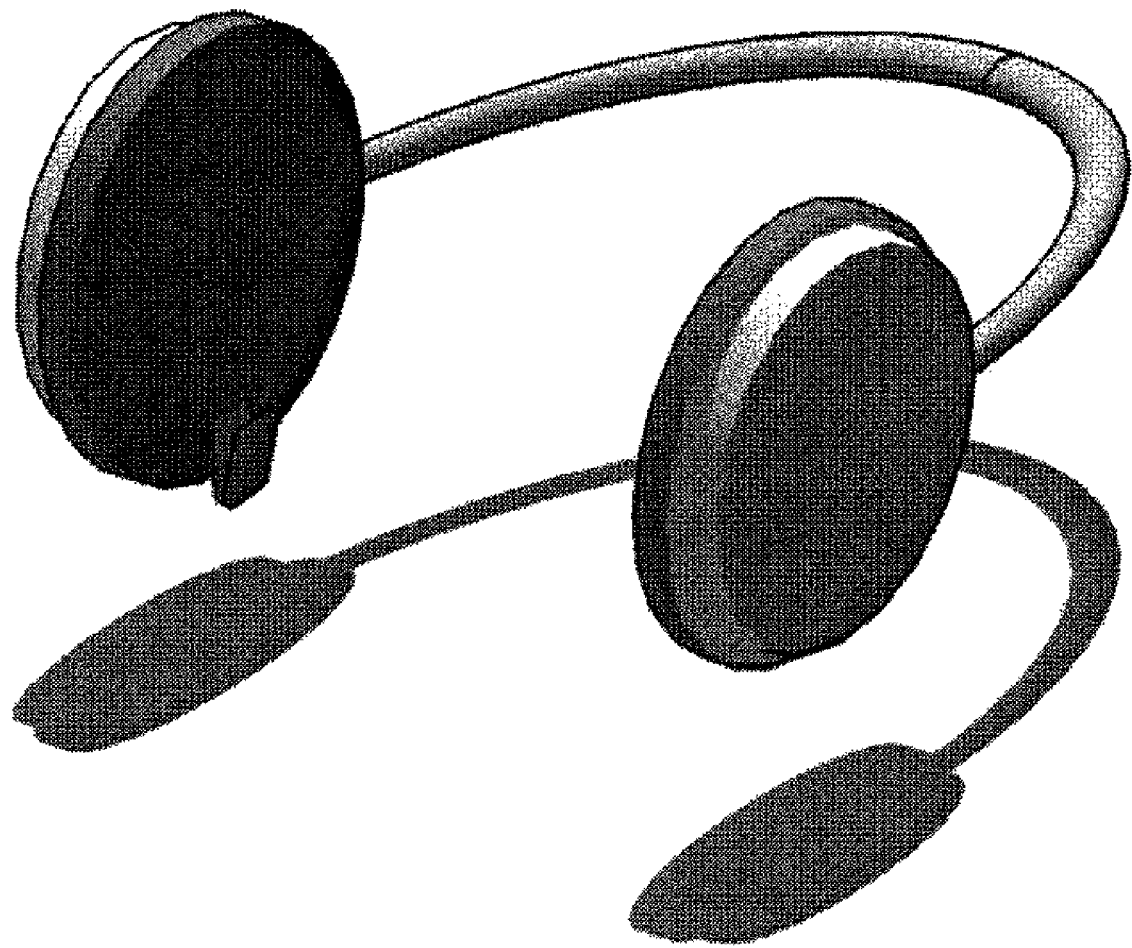
Figure 1D:
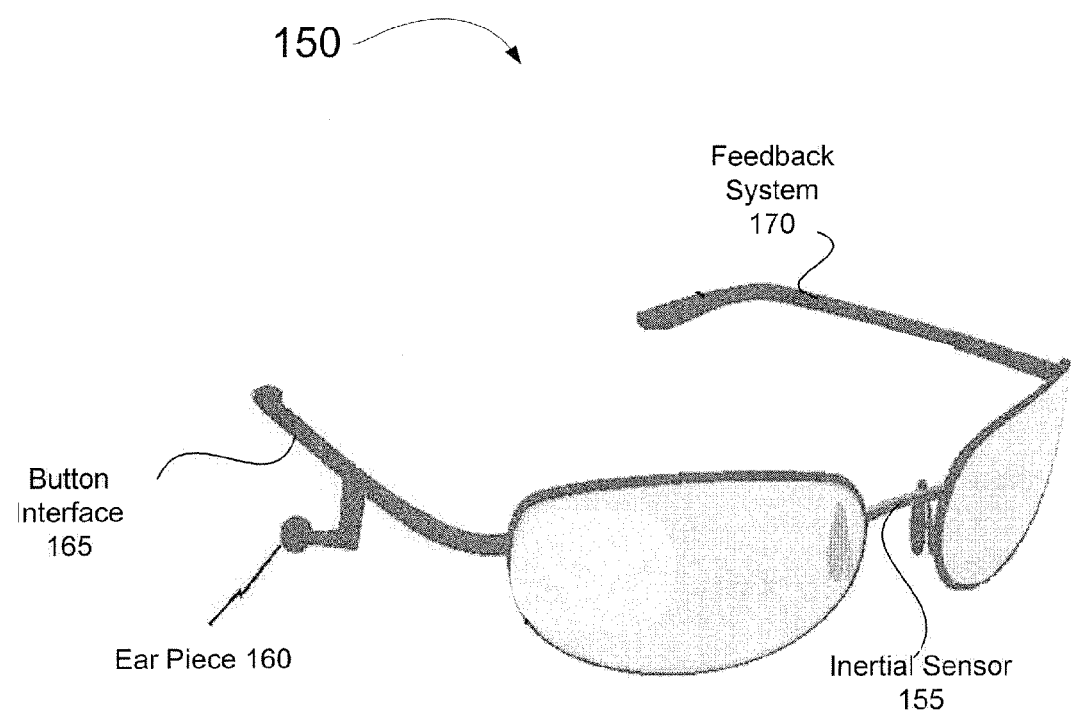

FIGS. 1A-1D are exemplary drawings of various headsets. Such headsets may be designed to be used with a handheld device such as a mobile phone, MP3 player, or other music player or device. In one embodiment, the headset is designed such that the positions that the headset may rest on a level surface, such as a table, is different from the orientation of the headset when worn by a user. As can be seen on FIG. 1A, the headset would have to rest on a sharp edge in order to be in the same position as on a user's head. Similarly, FIG. 1B illustrates one embodiment a headset configuration which is an in-ear device that may be used to ensure that the orientation when worn is not duplicated when the headset is stored or carried. FIG. 1C illustrates one embodiment of a headset which is a headphone having a similar quality. FIG. 1D illustrates one embodiment of a headset 150 which is a pair of glasses incorporating an inertial sensor 155, audio output 160, button interface 165, and feedback system 170.

Note that the term headset for the purposes of this patent encompasses all devices designed to be worn on the user's head, and designed to transmit sound to the user whether through an in-ear speaker, bone conduction, or any other means of audio output.

In one embodiment, a simple gravity sensor may be used to detect orientation (e.g. a suspended weight, which has the weight touching a contact, when the headset is in a particular orientation). In one embodiment, an accelerometer may be used to determine orientation. The orientation may be determined based upon the rolling averages of accelerations. In one embodiment, once the orientation is determined, a dominant axis is assigned based upon the orientation. Determining an orientation of the electronic device may include identifying a gravitational influence. The axis with the largest absolute rolling average may be the axis most influenced by gravity, which may change over time (e.g. as the electronic device is rotated). Therefore, a new dominant axis may be assigned when the orientation of the electronic device and/or the inertial sensor(s) attached to or embedded in the electronic device changes.

In one embodiment, the actual axis with the largest absolute rolling average over the sample period is assigned as the dominant axis. In alternative embodiments, the dominant axis does not correspond to one of the actual axes of the inertial sensor(s) in a current orientation, but rather to an axis that is defined as approximately aligned to gravity. In one embodiment, the dominant axis corresponds to a virtual axis that is a component of a virtual coordinate system. In one embodiment, a true gravity assessment, such as by doing trigonometric calculations on the actual axes based on the gravitational influence is performed to determine orientation.

By ensuring that the "worn" orientation is not likely when the device is elsewhere, a simple identification of the worn orientation is sufficient to identify that the headset is being worn.

Figure 2:
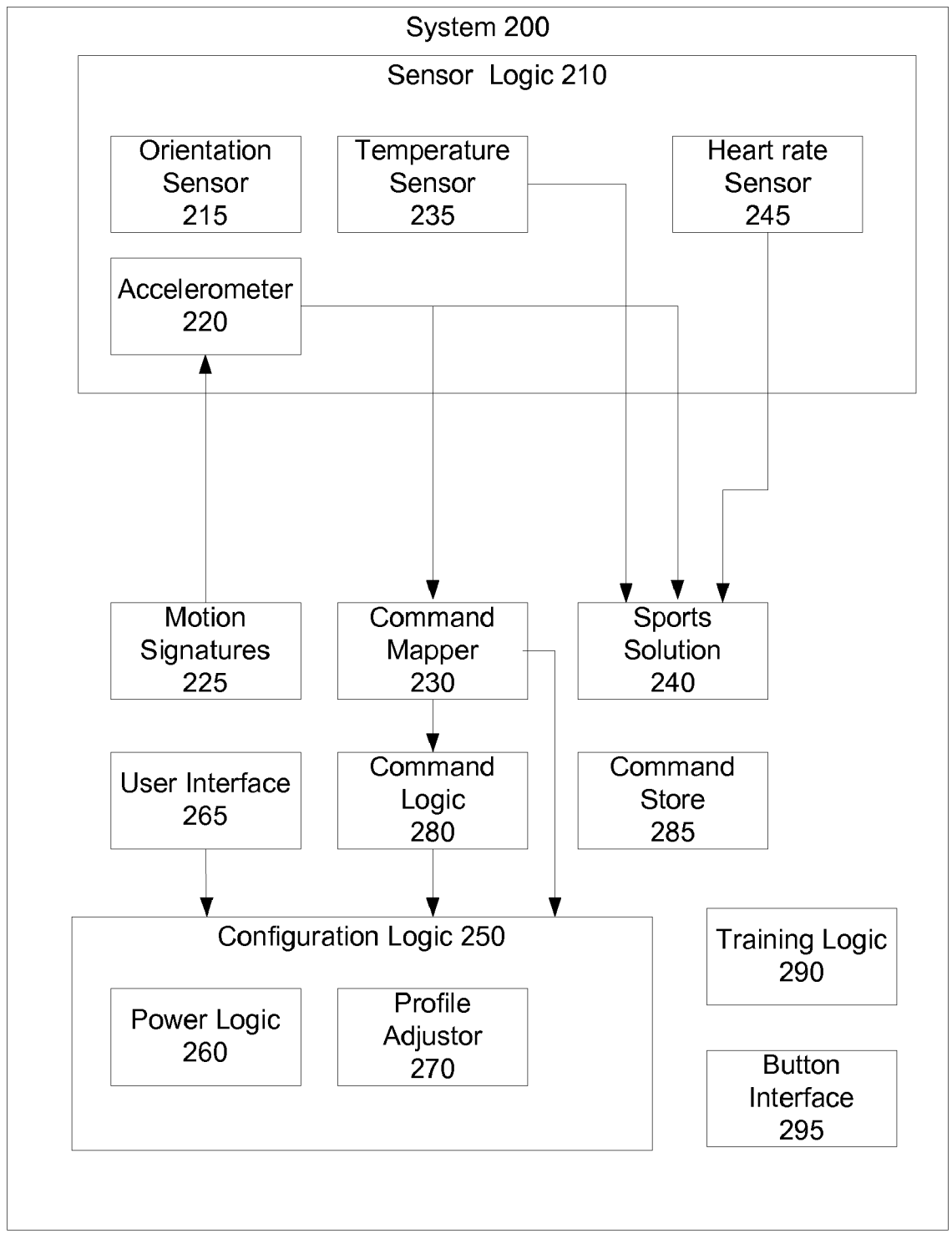
FIG. 2 is a block diagram of one embodiment of a headset.

FIG. 2 is a block diagram of one embodiment a headset control system. Note that the other aspects of the headset, e.g. transmission, voice control, any other features are not shown in this figure for simplicity.

The system 200 includes sensor logic 210. In one embodiment, the sensor logic 210 includes an orientation sensor 215. The orientation sensor 215 determines the orientation of the headset in space. In one embodiment, this is used for headsets configured to ensure that the "worn" orientation is not reproduced in other locations.

In one embodiment, the sensor logic 210 includes an accelerometer 220. The accelerometer 220 in one embodiment, determines orientation by detecting gravity, as noted above. In one embodiment, the accelerometer 220 determines whether a headset is being worn based on a motion signature. Generally speaking, people do not hold their heads perfectly steady. Even while standing still, minute motions are made naturally. The accelerometer 220 in the headset can detect these motions, and utilize that data to determine that the headset is being worn. In one embodiment, there are motion signatures 225 stored, to which the motions detected by the accelerometer are compared. In one embodiment, the motion signature of placing the headset on the ear and removing the headset from the ear is utilized to detect when the headset is being worn. If it has been placed on the ear, but not removed, the headset is almost certainly being worn.

In one embodiment, the accelerometer 220 is also used to detect commands indicated by motions such as taps and shakes. In one embodiment, command mapper 230 may be used to identify commands based on accelerometer data. In one embodiment, accelerometer 220 includes a buffer (not shown), to buffer the accelerometer data temporarily.

In one embodiment, a temperature sensor 235 may be used to detect that the headset is being worn. The temperature sensor 235 would detect the user's body temperature, which is unlikely to be achieved in other environments, e.g. on a desk, in a purse, etc. In one embodiment, the output temperature sensor 235 may also be used for detecting health issues. In one embodiment, the temperature sensor 235 may also be used to provide a temperature-based adjustment to a step counter 240. In one embodiment, the temperature sensor 235 may include two sensors, an ambient sensor (e.g. external to the user) and a body sensor (e.g. the user's body temperature). With two sensors, the system can distinguish between being in a hot car and being worn, based on a difference in ambient and body temperatures. In one embodiment, the temperature difference may also be used to adjust other measurements, as will be described below.

In one embodiment, a heart rate sensor 245 may be included in the system as well. In one embodiment the heart rate sensor 245 may be incorporated into an ear clip which is part of the headset. The signal from an infrared light transmitted through earlobe would then be used to detect the heart rate in one embodiment. In another embodiment, reflected infrared light somewhere else on the head where there is a high density of capillaries may be used. The heart rate detection may be used to determine whether the headset is being worn. In one embodiment, the heart rate data may also be used to provide an exertion based adjustment to the sports solution 240.

In one embodiment, one or more of the sensors 210 may be present in a headset, and the sensors can be used to determine with some certainty whether a headset is being worn by a user.

In one embodiment, as noted above, the system includes a sports solution 240. The sports solution 240 is used to calculate activity information which may include speed, distance, cadence, steps and data via the headset. In one embodiment, temperature or heart rate data may also be provided to the sports solution 240. The sports solution 240 can adjust the calories burned, or the cadences, based on such data, as appropriate. One embodiment of a step counting algorithm that may be used by the system is described in U.S. patent application Ser. No. 11/891,112, entitled "HUMAN ACTIVITY MONITORING DEVICE WITH DISTANCE CALCULATION." In one embodiment, the output of sports solution 240 may be provided to the user directly via audio feedback using training logic 290. In one embodiment, the sports solution's data may be made available to the user via alternative connections, e.g. a web page or a home computer. In one embodiment, the Sports solution tracks the user's steps taken throughout the day. This activity data and other sensor data may be sent to a remote server. It may be sent via SMS message through a wirelessly tethered mobile phone, or by alternative means. In one embodiment, the collected data received from the headset may be stored in a central location, and made available to the user. One example of such a system is described in co-pending application Ser. No. 11/192,549, entitled "MONITOR, CONTROL, AND SHARE (MACS) SYSTEM".

Figure 6:
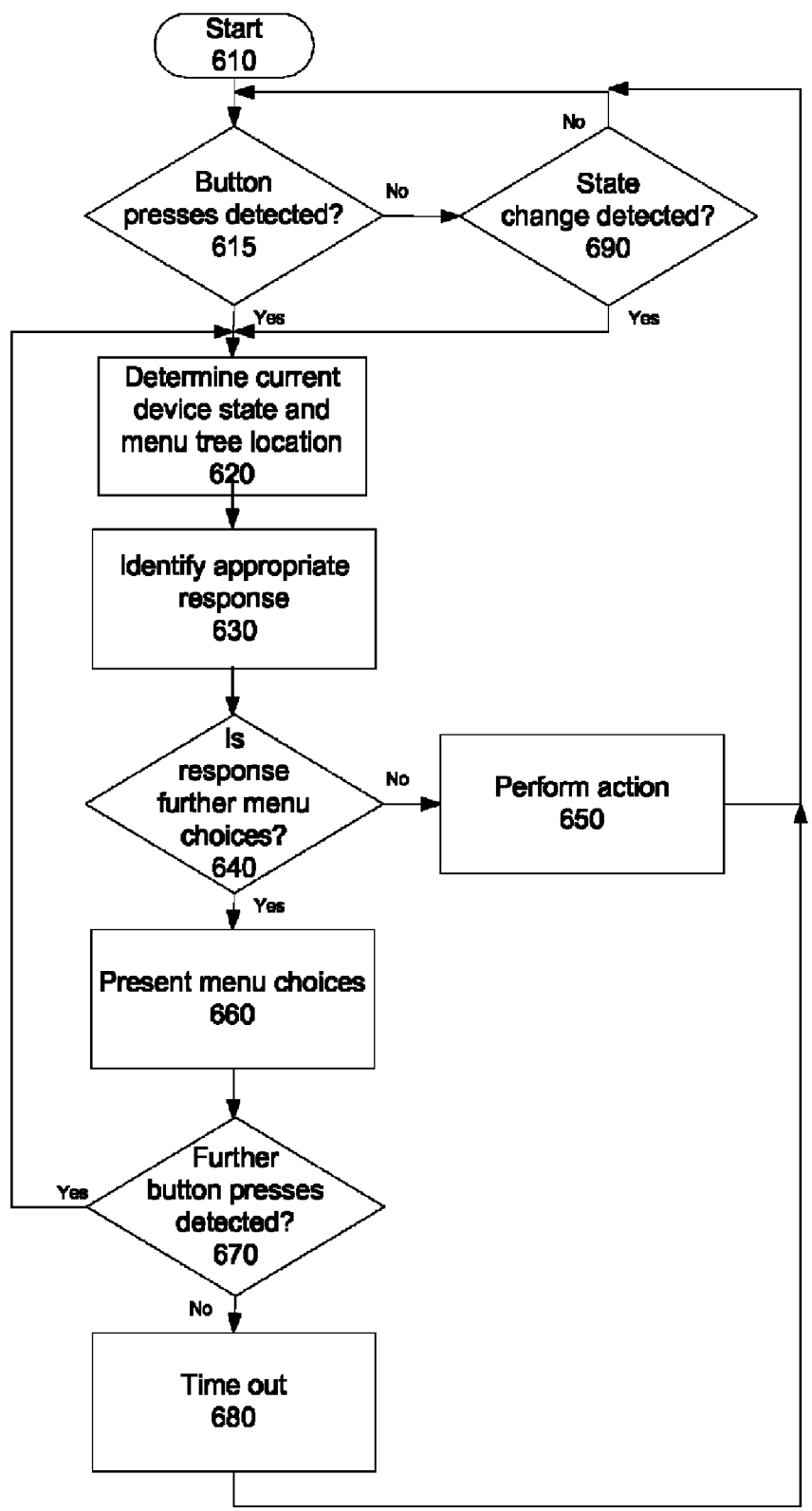
FIG. 6 is a flowchart of one embodiment of using a single button user interface.

In one embodiment, the headset further includes a button interface 295. Button interface along with speaker system enables a single button to provide control over the sports solution, and provide audio feedback to the user. FIG. 6 is a flowchart of one embodiment of using the single button navigation structure. FIG. 7 is an exemplary table that describes one embodiment of the command loops which can be used.

In one embodiment, the button interface provides the ability to utilize a looping menu system, enabling the user to perform complex selections with the single button.

In one embodiment, the system further includes configuration logic 250. Configuration logic 250 enables the system to change the settings/profiles based on detected information. In one embodiment, configuration logic 250 enables the headset to change the headset configuration.

In one embodiment, configuration logic 250 enables the headset to send commands to a mobile device which is coupled to the headset, and change the configuration of the mobile device as well.

In one embodiment, configuration logic 250 includes a power logic 260. Power logic 260 enables the headset to be powered down, when the headset is not being worn, and automatically turned on when the headset is worn. Generally speaking headsets such as Bluetooth headsets are powered by batteries. The user is supposed to manually turn them off when he or she takes them off. This often does not happen, draining the batteries. Therefore, the power logic 260 powers down the transmission and other high powered elements of the headset when the headset is not being worn. Simply by monitoring the sensors 210, which require little power compared to maintaining a Bluetooth or similar network, the headset can be powered down and up, based on actual use. In one embodiment, the power logic 260 gradually scales down sampling of the sensors, as time lapses. For example, while in use accelerometer data may be sampled every 10 milliseconds. When lack of activity is initially detected, the sampling rate may be increased to every 40 milliseconds, and as time lapses the sampling rate may be decreased—gradually, stepwise, or in one step—to the lowest sampling rate. In one embodiment, the lowest sampling rate is one sample per second.

In one embodiment, configuration logic 250 further includes profile adjustor 270. Profile adjustor 270 adjusts the headset and/or the related mobile device to a different profile. Device profiles include the format how notifications are displayed (e.g. ringing on the headset, ringing a mobile device, ringing both, vibration, etc.) When the system detects that the headset is worn, the profile adjustor 270 can adjust the notification profile to ring only in the headset (and not the phone), and vice versa if the phone is not being worn. Other profile adjustments may be implemented by the profile adjustor 270 in response to sensor input.

In one embodiment, the system further includes command logic 280. Command logic 280 utilizes data from the sensors 210 to execute commands. In one embodiment, command logic 280 utilizes data from the accelerometer 220. In one embodiment, command logic 280 interfaces with command store 285, which stores motion signatures for various commands. Such commands may include, for example "answer phone in response to detecting a tap-tap command if headset is on-ear," "answer phone in response to detecting a shake-shake command if the headset is not on-ear" or activate headset when detecting that headset is picked up and placed on ear," etc.

In one embodiment, the system further includes a user interface 265, which enables a user to adjust the settings. In one embodiment, the user may adjust the profile options, commands, and mappings through user interface 265.

Figure 3:
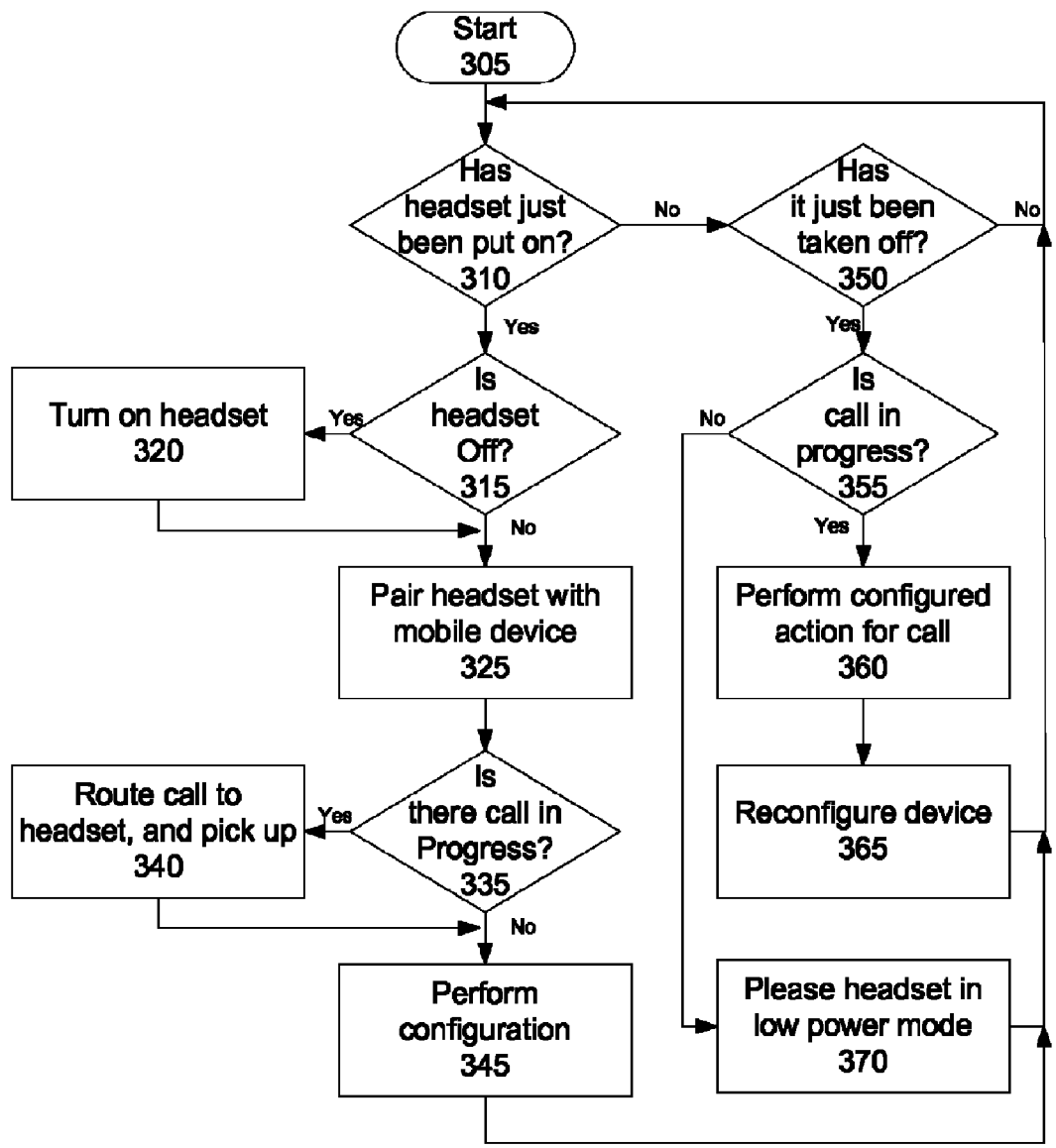
FIG. 3 is a flowchart of one embodiment of utilizing sensor data with a headset.

FIG. 3 is a flowchart of one embodiment of the system. The process, in one embodiment, is active whenever the handset is powered.

The process starts at block 305. At block 310, the process determines whether the headset has been placed into the "worn" position. The worn position corresponds to whatever position the headset inhabits when it is in use. If the process determines that the headset has been placed in the worn position, the process continues to block 315.

At block 315, the process determines whether the headset is currently off/on standby. If so, at block 320, the headset is turned on. In one embodiment, turning on the headset includes enabling any wireless communications, speakers, microphones and other aspects of a headset which would be utilized when the headset is in use. The process then continues to block 325. If the headset was not off, the process continues directly to block 325.

At block 325, the headset is paired to a mobile device, if this is appropriate. This is applicable only to wirelessly coupled headsets, as wired headsets need not be paired. If the headset is wireless, at block 325, whatever configurations need to be adjusted to couple the headset to the mobile device is performed. In one embodiment, the pairing may be done by utilizing a motion command. One embodiment of pairing in this manner is described in co-pending application Ser. No. 11/855,133 entitled "A METHOD AND APPARATUS TO ENABLE PAIRING OF DEVICES".

At block 335, the process determines whether there is a call in progress on the mobile device. If so, at block 340, the call is routed to the headset, and answered. This enables a user to pick up a call on a headset simply by placing the headset on the ear. In one embodiment, this feature may be enabled and disabled by the user. The process then continues to block 345. If there is no call in progress, the process continues directly to block 345.

At block 345, the process performs any other configuration steps. For example, in a mobile device such as a mobile phone, the configuration may include setting the ringer to ring via the headset only, etc.

The process then returns to block 310, to continue monitoring the status of the headset.

If at block 310 the process determined that the headset had not been put on, the process continues to block 350.

At block 350, the process determines whether the headset has been taken off. If so, the process continues to block 355. Otherwise, the process returns to block 310 to continue monitoring the status of the headset.

At block 355, the process determines whether there is a call in progress, if the mobile device is a telephone. If there is a call in progress, at block 360, the call is placed on hold, as a result of the headset being taken off. In another embodiment, the call may be routed to a speaker phone. In another embodiment, the call may be routed to a speaker phone, and the microphone may be muted. In one embodiment, the user may configure which of these options occurs. In one embodiment, the user may, while removing the headset, perform a motion command to select an option. In one embodiment, nothing further happens until the call is terminated. The device remains in this state, in one embodiment until the user performs another action. Therefore, the process returns to block 310, to monitor the headset. If there was no call in progress, as determined at block 360, the process continues to block 365.

At block 365, the process re-configures the device as if the headset were not connected. For example, it ensures that any notifications happen through the mobile device, not the headset.

At block 370, the headset is placed in suspend or low-power mode. In this mode, there is sufficient power maintained to monitor at least one sensor. However, other elements such as Bluetooth or other wireless connections are turned off. This extends the battery life of the device. The process then returns to block 310, to monitor for motion.

Figure 4:
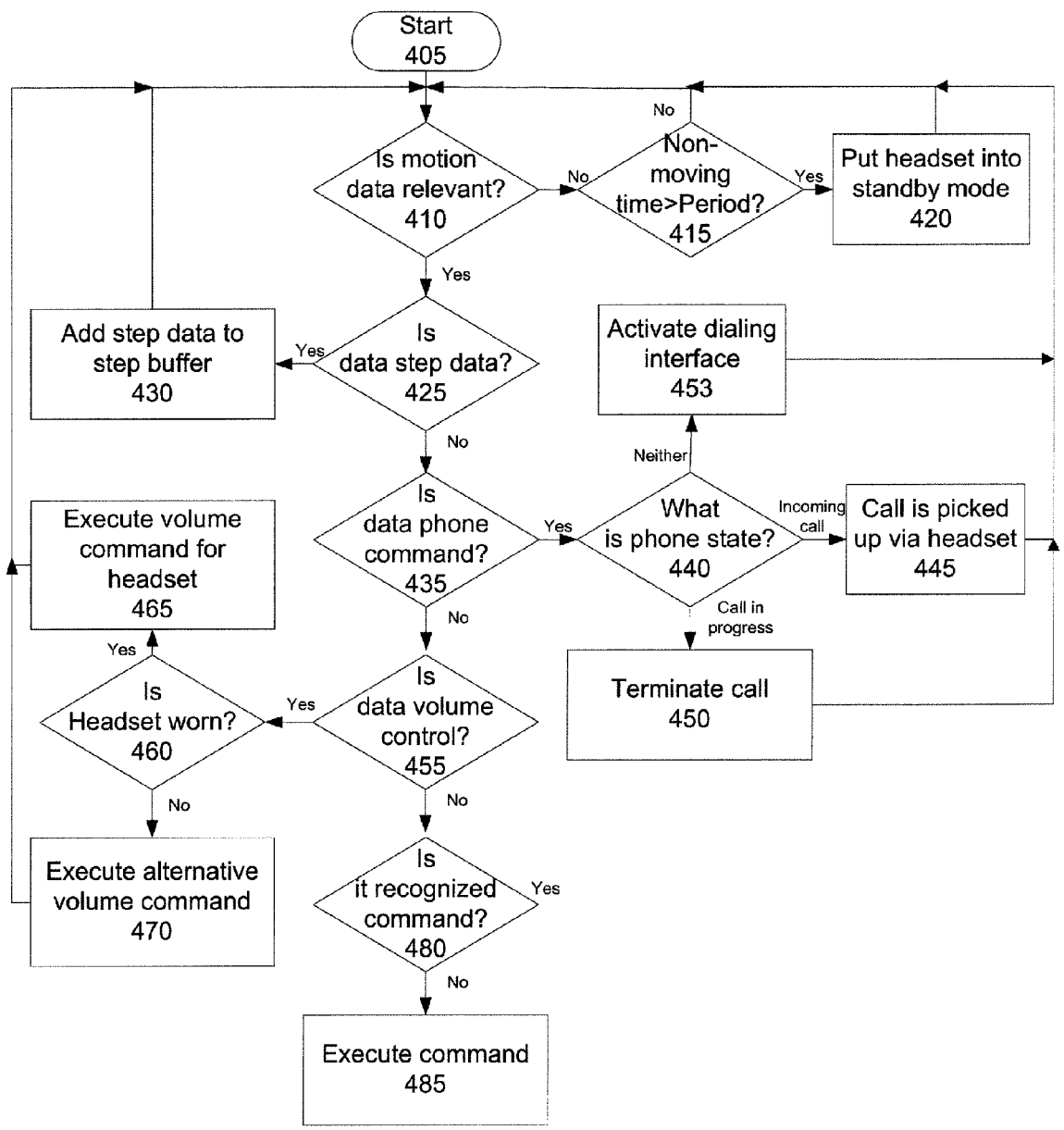
FIG. 4 is a flowchart of one embodiment of using command data for a headset.

FIG. 4 is a flowchart of one embodiment of using command data for a headset. In one embodiment, accelerometer data is continuously received in a buffer, and evaluated.

The process starts at block 405. At block 410, the process determines whether the data in the buffer corresponds to relevant accelerometer data, e.g. sufficient data for evaluation. Relevant accelerometer data is accelerometer data which may correspond to a command, step, or other monitored unit. If no accelerometer data was received, the process continues to block 415. At block 415, the process determines whether a sufficient period of no motion has occurred. Humans are always moving, at least minor muscle tremors occur even while holding "perfectly still." Therefore, a complete lack of motion indicates that the device is not being worn by a user. If a sufficient period of motionlessness has occurred—in one embodiment 5 seconds—the headset is turned off/put on standby. The process then ends at block 420. Note that the headset, in one embodiment, continues to monitor for accelerations, even while in standby mode.

If, at block 415, the process determines that the period of non-motion is below the threshold, the process returns to block 410, to continue monitoring the acceleration data.

If, at block 410, the process determined that relevant accelerometer data had been received, the process continues to block 425.

At block 425, the process determines whether the accelerometer data corresponds to a step. A step is a unit of movement which is used to monitor a user's activity level. If so, at block 430, the step is added to the step buffer. The data corresponding to the step is then removed from the accelerometer buffer. The process then returns to block 410, to continue monitoring the accelerometer data.

If, at block 425, it was determined that the data did not correspond to a step, the process continues to block 435.

At block 435, the process determines whether the acceleration was a phone command. In one embodiment, one phone command is a shake shake (e.g. a particular identified motion). Note that shake shake in this case corresponds to sharp changes in direction (e.g. rapidly moving the device up-down-up-down). In one embodiment, a shake is defined by an acceleration, a sharp change in direction, and another acceleration, for example rapidly moving the device up and then down. Note that while shake shake is the motion command described, alternative commands may be defined as well. In one embodiment, the shake shake command may be available when the headset is not worn. In one embodiment, when the headset is worn, a phone command may be a tap-tap (e.g. two taps on the headset itself). However, any other defined set of motions may be substituted for the purposes of this discussion.

If the acceleration was identified as a phone command, at block 440, the process determines whether there is an incoming call, a call in progress, or neither. If there is an incoming call, at block 445, the phone command picks up the call. In one embodiment, the phone command further routes the call to the headset. Since the user is utilizing the headset accelerometer command to pick pick up the call, it is assumed that the user will wish to utilize the headset for the call. In one embodiment, the user may choose to route the call to voicemail, instead of answering the call, by utilizing a different command. For example, tapping the device three times may be the "send to voicemail command." For another example, taking the headset off may be a command to send the incoming call to voicemail.

If there was a call in progress, at block 450, in one embodiment the phone command is used to terminate the call. If neither was true, in one embodiment the headset instructs the mobile device to display an interface at block 453. In one embodiment, the interface may be a dialing interface. In one embodiment, the interface may be a speech recognition menu. The process then returns to block 410, to continue monitoring the accelerometer data. If the data was not a phone command, the process continues to block 455.

At block 455, the process determines whether the acceleration data corresponds to volume control. Controlling volume, in one embodiment, is based on a motion signature. In one embodiment, the user may define an appropriate motion signature. For example, volume control in one embodiment may comprise a tap-tap (e.g. two short taps on the headset while it is worn.) If the acceleration data was a volume control, the process continues to block 460. At block 460, the process determines whether the headset is being properly worn. In one embodiment, "properly worn" indicates that the headset is worn in a way that the user can utilize the speaker in the headset if one is present. If the headset is properly worn, then the volume control is adjusted in response to the volume control command, at block 465. In one embodiment, the volume control is a cycle (e.g. each tap-tap command increases the volume until a maximum volume is reached, and subsequent tap-taps decrease the volume). Alternative methods of volume control may be used. For example, a tap-tap on one side of the device may indicate that the volume should be increased, while a tap on the other side of the device may indicate that the volume should be decreased. If the headset is not worn, an alternative volume command is executed, at block 470.

At block 480, the process determines whether the accelerometer data corresponds to any other command that is recognized. If so, that command is executed, at block 485. The command execution may vary by the position of the headset. In one embodiment, a different command may be associated with the same accelerometer data when the headset is worn v. when the headset is in a rest position. The process then returns to block 410, to continue monitoring the accelerometer data.

Figure 5:
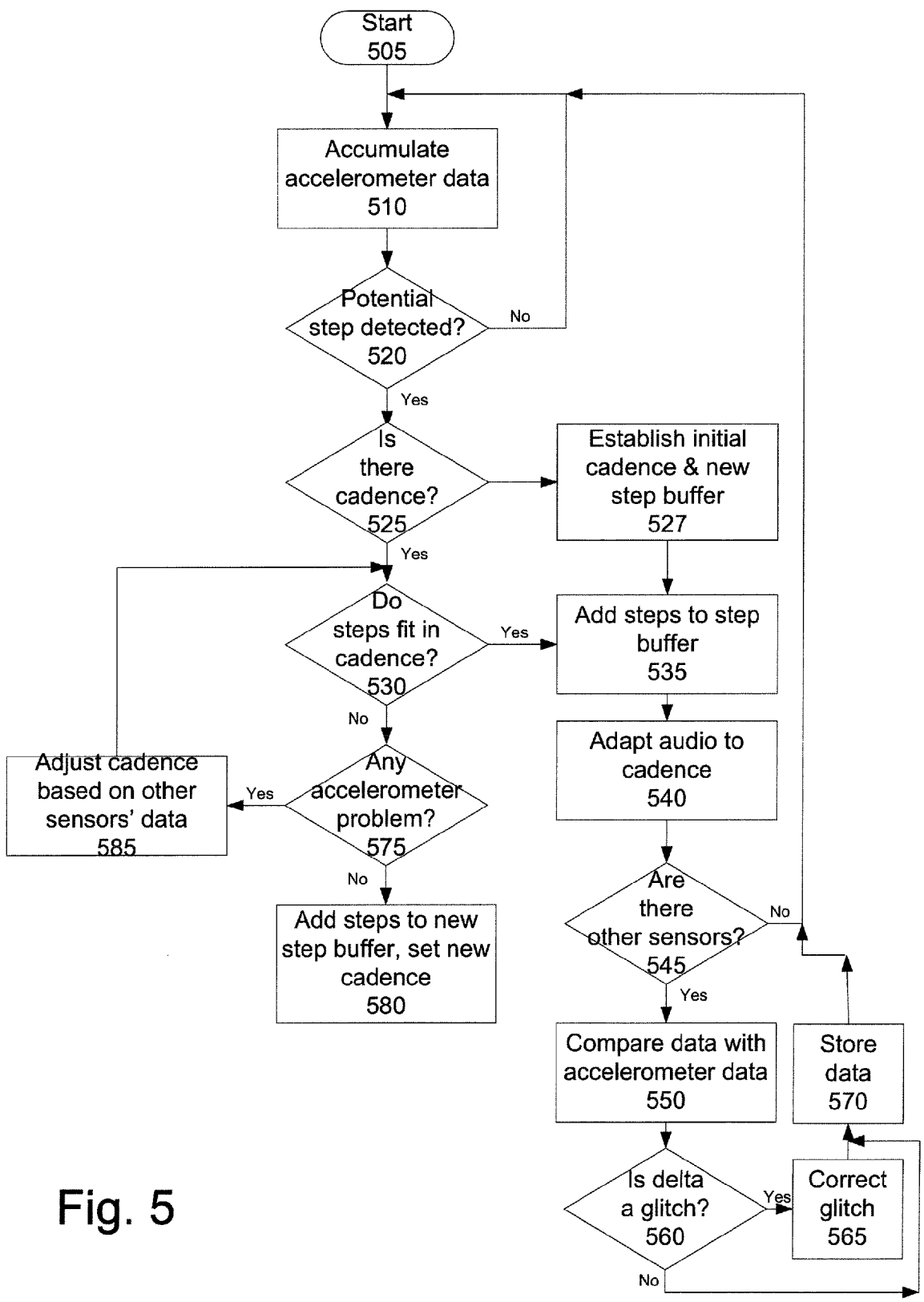
FIG. 5 is a flowchart of one embodiment of using other sensor data with a headset.

FIG. 5 is a flowchart of one embodiment of using other sensor data with a headset. In one embodiment, the headset can be used as a step counter. Step counting is useful for determining a user's activity level. In one embodiment, the step counting mechanism is independent of the headset's location, e.g. it works whether the headset is worn, or carried in a pocket, bag, backpack, purse, or elsewhere on the user.

The process starts at block 505. At block 510, the process accumulates accelerometer data. At block 520, the process determines whether a potential step has been detected. In one embodiment, if a potential step is detected, the process continues to block 525. Otherwise, the process returns to block 510, to continue accumulating accelerometer data.

At block 525, the process determines whether there is an established cadence for the steps. Generally speaking, people walk at a particular cadence, and their cadence does not change unless circumstances change, e.g. the terrain, environment, or goals change.

If there is an established cadence, at block 530, the process determines whether the potential steps fit within the cadence. If so, at block 535, they are added to the step buffer. The process then continues to block 540.

At block 540, the audio output is adapted—if it is not already so—to the user's cadence/steps. That is, based on the cadence, the system estimates a noise level, and adjusts audio output. Generally, when a user is running the ambient noise level is quite a lot higher than during a stroll. Therefore, in one embodiment, the audio output—whether of a mobile telephone, a mobile music player, or another device—is adjusted based on the user's cadence.

In one embodiment, the system may further include a training aspect. The training aspect provides audio feedback to the user. The cadence-adjustment for the audio feedback ensures that the feedback is appropriate to the cadence. A user running at a steady high cadence, as exercise, is likely interested in different data than a user who is taking a leisurely stroll. In one embodiment, if the headset measures that the user is walking, it provides walking walking related feedback focused on number of steps, aerobic steps, distance and calories. In one embodiment, if the headset detects a run, then feedback is on running parameters such as distance covered, pace, and speed. In one embodiment, the feedback itself, and the particular types of feedback at various cadences, are configurable by the user.

At block 545, the process determines whether there are other sensors whose data should be integrated with the accelerometer data. If so, the process continues to block 550. Otherwise, the process returns to block 510, to continue monitoring the accelerometer data.

At block 550, the process compares sensor data with expected data. The expected data is based on immediate past data—e.g. the last set of readings for this user. In one embodiment, expected data may also utilize statistical data regarding this user, or equivalent users.

If there is a difference between the expected data and the actual sensor data, at block 560, the process determines whether the difference is an actual difference or a glitch or spike that should be ignored, or a potential problem.

For example, when measuring heart rate through an earclip, the ambient lighting and user's sweat may affect the readings from the sensor. Using the accelerometer data can adjust for such. For example, if a user is running along at a constant cadence and relatively constant heart rate, if there is a sudden spike in the heart rate, there should be a corresponding change in cadence to reflect this change in heart rate. If cadence has not changed in either either direction, then this anomaly in the heart rate can be removed.

In another example, if one of the sensors is a pressure sensor, it can be used to measure changes in elevation. Knowing elevation changes can be again used to correct the sensor data. For example, if heart rate increases, and the pressure sensor shows that the user is climbing in elevation, and cadence changes slightly, then the system can determine that the user is running up a hill. If cadence is unchanged, elevation is unchanged, but heart rate spikes up or down, again this can be corrected, if it is the result of interfering factors such as user's sweat or changes in ambient lighting effecting the reading of an ear clip heart rate monitor.

If, at block 560, the process determines that the change is a glitch and is not a real change in the parameter being measured, the data is corrected at block 565. At block 570, the data is stored. In one embodiment, the full data is stored, but the glitch is labeled. In one embodiment, by making this correction, the user is reassured that the sensor error is not an indicator of a health problem. In another embodiment, the glitch is not displayed. In one embodiment, the glitch data may be displayed upon specific request. In one embodiment, the glitch data may be collected for the purposes of evaluating sensor quality, accuracy, or usefulness. In another embodiment, the glitch data is not stored at all. The process then returns to block 510, to continue collecting data.

If at block 530, the process determined that the current steps were not within the cadence, the process continues to block 575.

At block 575, the process utilizes the sensor data to determine whether there are any abnormalities in the accelerometer readings. This parallels the discussion about correcting sensor glitches based on accelerometer data. If no corrections are needed, at block 580, the process starts a new step buffer. This new step buffer will be maintained until a new cadence is established. If there are abnormalities, at block 575, the process adjusts the cadence data based on the sensor information at block 585. The process then returns to block 530, and the step data is then either added to the existing step count, or to the new step buffer, depending on whether the adjusted cadence is still different from a current cadence.

If at block 525, no cadence was detected, the process continues to block 527. At block 527, a new cadence is established based on the new potential step data, and a new step buffer is initialized. The process then continues to block 535, where the potential step is added to the new step buffer.

FIG. 6 is a flowchart of one embodiment of using a single button interface. The process starts at block 610. In one embodiment, the process starts when the device is active, but no buttons have been pressed.

At block 615, the process determines whether any buttons presses have been detected. In one embodiment, multiple button presses in rapid sequence may comprise a single command. Therefore, prior to evaluating the button press data the device ensures that the button presses are finished. If so, the process continues to block 620. Otherwise, the process continues to block 660.

At block 620, the process determines the current state of the device, and the current location in the menu tree. At block 630, the appropriate response is identified. The appropriate action may be a change in state (e.g. turning on or off some feature), a change in feature (e.g. turn up or down the volume), or presenting another menu option. At block 640, the process determines whether the menu choice is an action, or the presentation of additional menu choices. If the response was to perform an action, at block 650 the action is performed. The process then returns to block 615 to monitor for further button presses.

If the response is the presentation of further menu choices, the process continues to block 660. At block 660, in one embodiment, menu choices are presented by verbally listing the options to the user.

If so, the process continues to block 670, to detect a subsequent button presses. At block 670, a subsequent button press is detected. The process then continues to block 620, to act on the subsequent button press.

If there is no subsequent selection at block 670, the process times out after a while, at block 680. After the process times out, it returns to block 615, to determine whether any button presses have been detected.

If, at block 615, no button presses are detected, the process continues to block 690. At block 690, the process determines whether there has been any state change detected that may trigger an action in the menu. For example, in one embodiment, a user beginning or ending a workout may trigger an action. In one embodiment, the sensor data is used to detect the state changes.

If no state change is detected, the process returns to block 615, to continue monitoring for button selections. If a state change is detected, the process continues to block 620, to detect the new state of the device, and the current location in the menu tree. In this way, the user can control the device utilizing only a single button.

In one embodiment, the headset may include a sports/lifestyle button. FIG. 7 is a table of one embodiment of using this feature.

The sports/lifestyle button provides a single button user interface. In one embodiment, this works for a single ear solution as well as a stereo headset. The button enables a user to navigate through various options, without having to take off the headset, and without requiring a visual feedback mechanism (e.g. a screen). Furthermore, by only using a single button as the interface, the user need not grope for the correct button, and the interface can be easily implemented on a device with extremely limited real-estate such as a headset.

FIG. 7 illustrates an exemplary navigation using a single button, for a lifestyle/sports application. As can be seen, depending on the starting condition, the result of each button press differs. In one embodiment, audio feedback may be used, to indicate what command was received. In another embodiment, the feedback may be via vibration, or audio data provided via bone conduction rather than a speaker.

In the table shown in FIG. 7, the user can start, pause, and stop a workout program. In one embodiment, while the workout program is active, a musical accompaniment may play.

FIG. 7 shows an exemplary table of actions in response to various types of activations of a single button. One of skill in the art would understand that this would apply to other types of applications, for example to navigation with a music player, a mobile phone application, etc.

Figure 8:
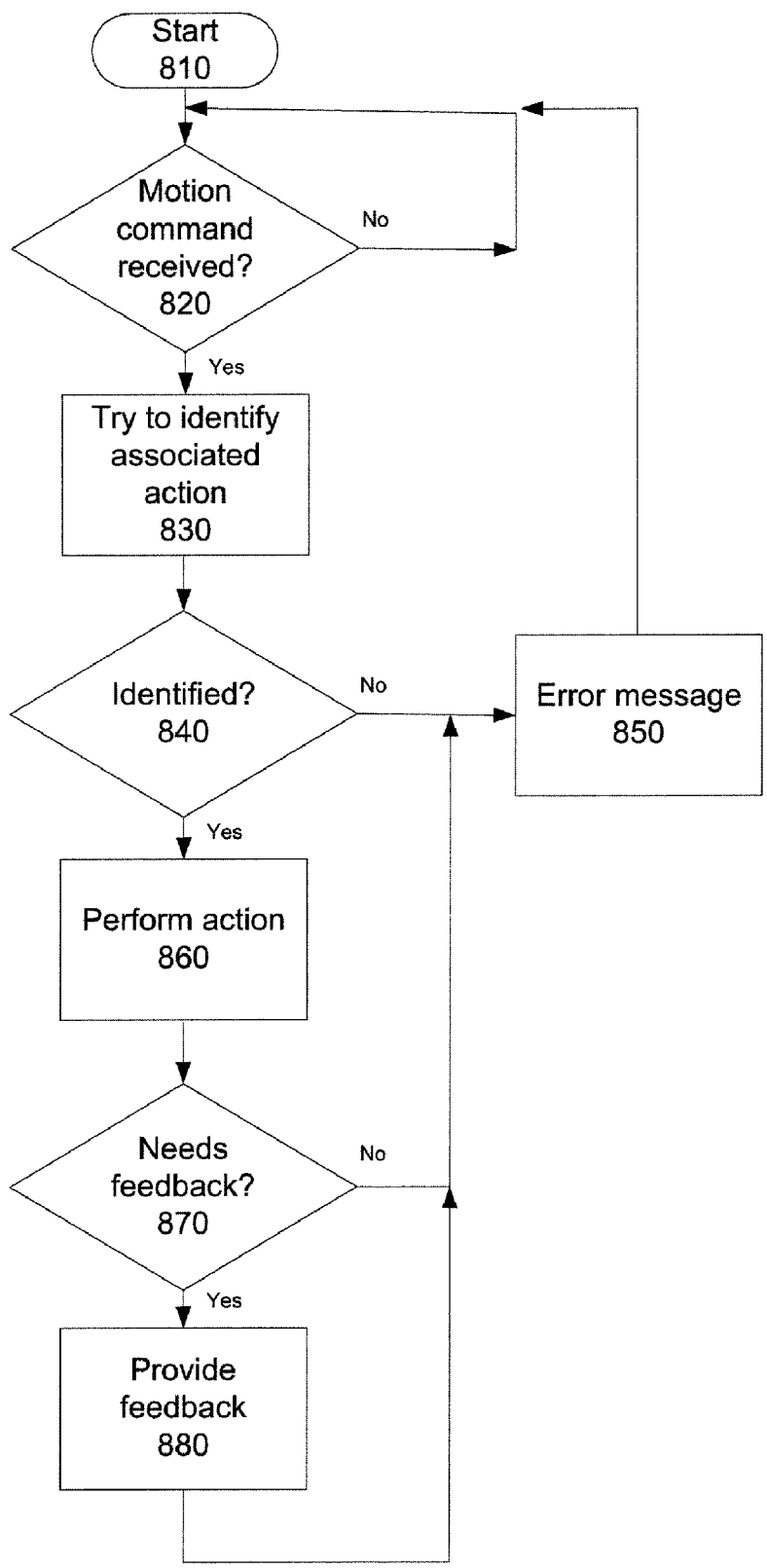
FIG. 8 is a flowchart of one embodiment of using accelerometer based commands.

In one embodiment, the user may utilize motions to communicate commands, instead of or in addition to using a button interface. FIG. 8 is a flowchart of one embodiment of accelerometer based commands, and appropriate feedback.

The process starts at block 810. In one embodiment, the system continuously monitors for motion commands.

At block 820, the process determines whether a motion command has been received. A motion command, in one embodiment may be a shake shake command. A shake shake command is a rapid up-down-up-down movement of a device. Of course, this command can only be received when the device is not being worn. In one embodiment, the motion command may be a tap tap command. A tap tap command is two taps in rapid sequence on the device itself. This command can be most easily received when the device is worn.

If a motion command was received, at block 830, the associated action is identified if possible. If the associated action cannot be identified, at block 840, the process informs the user of this failure, at block 850. If the action is successfully identified, at block 860 the action is taken. In one embodiment, the associated action depends on a state of the device. For example, if the device is a music player that also has a mobile phone aspect, a tap tap command may mean "answer the phone" if there is a call in progress, or "advance to the next song" if there is no call, and the music is playing. In one embodiment, the user may program the commands available for each type of motion command. In one embodiment, a set of default commands may be pre-programmed.

At block 870, the process determines whether feedback should be provided for the command. If feedback should be provided, the process provides the appropriate feedback at block 880. Feedback for the command may include spoken audio feedback (e.g. "exercise program initiated"), tone audio feedback (e.g. a beep), or feedback provided through bone conduction for a headset that is being worn. Bone conduction is the conduction of sound to the inner ear through the bones of the skull. The process then returns to block 810 to continue monitoring for commands.

Figure 9:
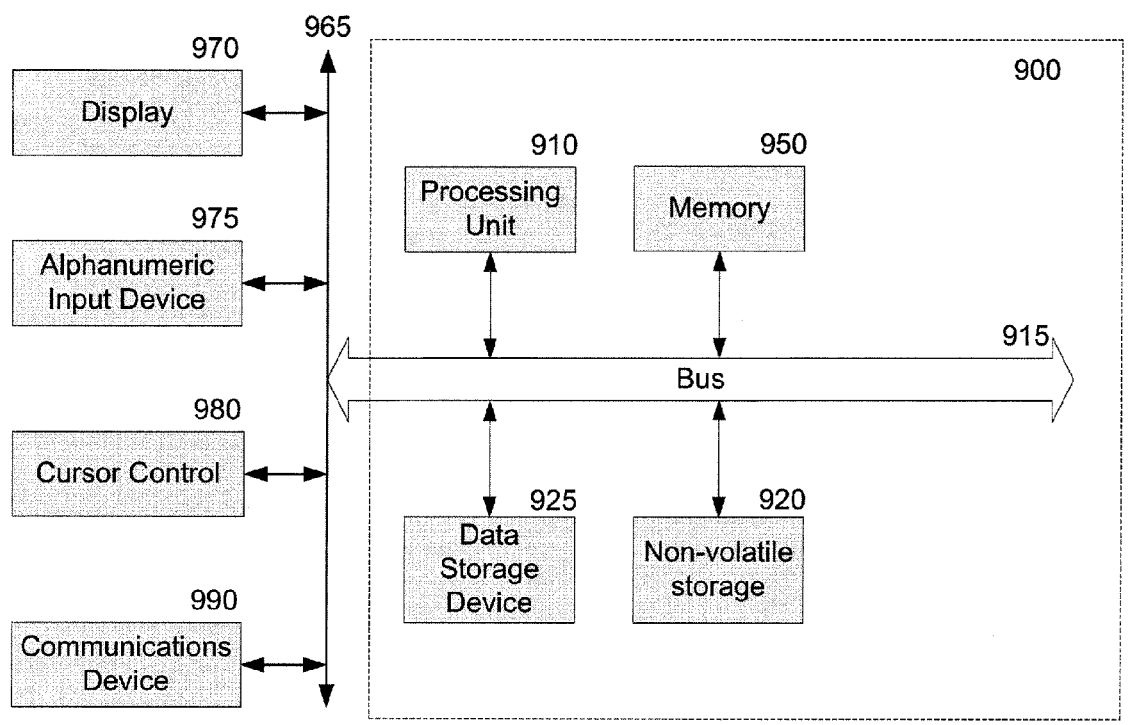
FIG. 9 is a block diagram of one embodiment of a computer system which may be used with the present invention.

FIG. 9 illustrates a block diagram of one embodiment of a computer system which may be used with the present invention. It will be apparent to those of ordinary skill in the art, however that other alternative systems of various system architectures may also be used. The computer system may include a bus or other internal communication means 915 for communicating information, and a processor 910 coupled to the bus 915 for processing information. The system further comprises a random access memory (RAM) or other volatile storage device 950 (referred to as memory), coupled to bus 915 for storing information and instructions to be executed by processor 910. Main memory 950 also may be used for storing temporary variables or other intermediate information during execution of instructions by processor 910. In one embodiment, the system also comprises a read only memory (ROM) and/or static storage device 920 coupled to bus 915 for storing static information and instructions for processor 910, and a data storage device 925 such as a flash memory, magnetic disk, optical disk and its corresponding disk drive. Data storage device 925 is coupled to bus 915 for storing information and instructions.

The system may include various input/output devices, such as a screen 970, audio output, keyboard 975, button, mouse 980, etc. These I/O devices may also be coupled to bus 915 through bus 965 for communicating information and command selections to processor 910. Another device, which may optionally be coupled to computer system 900, is a communication device 990 for accessing other nodes of a distributed system via a network. The communication device 990 may include any of a number of commercially available networking peripheral devices such as those used for coupling to an Ethernet, token ring, Internet, or wide area network. The communication device 990 may further be a null-modem connection, a wireless connection mechanism, or any other mechanism that provides connectivity between the computer system 900 and the outside world. Note that any or all of the components of this system and associated hardware may be used in various embodiments of the present invention. It will be appreciated by those of ordinary skill in the art that any configuration of the system may be used for various purposes according to the particular implementation. The control logic or software implementing the present invention can be stored in main memory 950, mass storage device 925, or other storage medium locally or remotely accessible to processor 910.

It will be apparent to those of ordinary skill in the art that the system, method, and process described herein can be implemented as software stored in main memory 950 or read only memory 920 and executed by processor 910. This control logic or software may also be resident on an article of manufacture comprising a computer readable medium having computer readable program code embodied therein and being readable by the mass storage device 925 and for causing the processor 910 to operate in accordance with the methods and teachings herein.

The present invention may also be embodied in a handheld or portable device containing a subset of the computer hardware components described above. For example, the handheld device may be configured to contain only the bus 915, the processor 910, and memory 950 and/or 925. The present invention may also be embodied in a special purpose appliance including a subset of the computer hardware components described above. For example, the appliance may include a processor 910, a data storage device 925, a bus 915, and memory 950, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 910. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A headset comprising:
   a sensor logic apparatus to obtain sensor data, the sensor data defining an orientation of the headset indicating whether the headset is being worn by a user; and
   a configuration logic apparatus to configure the headset based on the sensor data, wherein the sensor data comprises a motion signature indicative of physical movement of the headset and the orientation of the headset defined by the sensor data, and wherein the configuration logic compares the motion signature from the sensor data with a plurality of different predefined motion signatures indicative of different physical user movements of the headset, that include at least a motion signature indicative of placement of the headset upon a user's ear and a motion signature indicative of removal of the headset from the user's ear, to determine whether the headset is being worn based on the orientation of the headset and a motion signature matched by the comparison.

2. The headset of claim 1, further comprising a headset shape configured to define a particular orientation associated with the headset being worn, the headset shape configured to ensure that the particular orientation is not duplicated when the headset is placed somewhere else.

3. The headset of claim 1, wherein the headset comprises one of the following: an earbud, a headphone, a headset including a microphone and a speaker, and glasses incorporating a speaker.

4. The headset of claim 1, wherein the sensor logic apparatus includes an accelerometer to detect movements of the headset, the movements used to determine a location of the headset on a user's body.

5. The headset of claim 1, wherein the configuration logic apparatus comprises a power logic to switch the headset from and to stand-by.

6. The headset of claim 5, further comprising:
the power logic to automatically place the headset into stand-by mode when the headset is not moving, indicating that the headset is not being worn by a user.

7. The headset of claim 1 wherein the sensor logic apparatus comprises:
an accelerometer to detect a gesture, the gesture comprising placing the headset on a user's head or removing the headset from the user's head.

8. The headset of claim 1, wherein the sensor logic apparatus comprises:
an accelerometer to detect a motion command, the motion command defined by a motion signature;
a command logic to interface with a command store, wherein the command store stores a plurality of motion signatures each associated with a different motion command, wherein each motion command comprises comprising a defined set of motions associated with a particular action; and
a command mapper to identify a command associated with the motion command based on the motion signature.

9. The headset of claim 8, wherein the motion command comprises one or more of the following: a shake shake command when the headset is not being worn, a tap tap command when the headset is being worn.

10. The headset of claim 8, wherein the configuration logic apparatus is further to execute the command identified.

11. The headset of claim 8, further comprising:
a feedback logic to provide feedback to the user regarding the identified command.

12. The headset of claim 1, further comprising:
a profile adjustor to adjust settings of the headset based on the sensor data.

13. The headset of claim 12, further comprising:
the profile adjustor to adjust a setting of a mobile device linked to the headset based on the sensor data.

14. The headset of claim 1, further comprising:
a button logic to enable control of a function of the headset utilizing a single button and non-visual feedback.

15. A method comprising:
determining a motion signature and an orientation of a headset based on sensor data, wherein the motion signature is indicative of physical movement of the headset and determined from the sensor data based on a comparison of the motion signature with a plurality of different predefined motion signatures indicative of different user movements, wherein the different predefined motion signatures include at least a motion signature indicative of placement of the headset upon a user's ear and a motion signature indicative of removal of the headset from the user's ear;
determining whether the headset is being worn by a user based on the motion signature matched by the comparison and the orientation of the headset; and
configuring the headset based on whether the headset is being worn by a user.

16. The method of claim 15, further comprising:
identifying a motion command based on data from an accelerometer; and
identifying a command associated with the motion command; and
executing the command.

17. The method of claim 16, wherein the command comprises one or more of the following: altering a configuration of the headset, altering a configuration of a device coupled to the headset, altering an output characteristic of the headset, altering an output characteristic of the device coupled to the headset.

18. The method of claim 15, further comprising:
providing a single button interface to enable a user to navigate through a set of menus utilizing a single button and audio feedback.

19. A headset comprising:
an accelerometer to detect motions and an orientation of the headset, the motions providing a motion signature indicating physical movement of the headset for determination of whether the headset is being worn; and
a configuration logic to configure the headset based on the motion signature and the orientation of the headset, wherein the motion signature is determined to indicate the headset is being worn from the detected motions based on a comparison of the motion signature with a plurality of different predefined motion signatures indicative of different user movements, wherein the different predefined motion signatures include at least a motion signature indicative of placement of the headset upon a user's ear and a motion signature indicative of removal of the headset from the user's ear.

20. The headset of claim 19, further comprising:
a command mapping logic to identify a command associated with a motion signature.

21. The headset of claim 19, further comprising:
a power logic to adjust a power state of the headset based on the determination whether the headset is being worn.

22. The headset of claim 19, further comprising:
a sensor logic to detect a motion command based on data from the accelerometer;
a command mapping logic to identify a command based on the motion data and whether the headset is being worn.

* * * * *

UNITED STATES PATENT AND TRADEMARK OFFICE
CERTIFICATE OF CORRECTION

PATENT NO.        : 8,320,578 B2                                    Page 1 of 1
APPLICATION NO.   : 12/113110
DATED             : November 27, 2012
INVENTOR(S)       : Philippe Kahn et al.

It is certified that error appears in the above-identified patent and that said Letters Patent is hereby corrected as shown below:

On the title page, at item (54) and Column 1, line 1: delete "HEADSET" and insert --HEADSET WITH ORIENTATION AND MOTION DETECTION--.

Signed and Sealed this
Twenty-ninth Day of January, 2013

David J. Kappos
*Director of the United States Patent and Trademark Office*